June 3, 1958 T. M. JENNEY 2,837,411
PROCESS FOR PRODUCTION OF HYDROGEN PEROXIDE
Filed Nov. 25, 1952
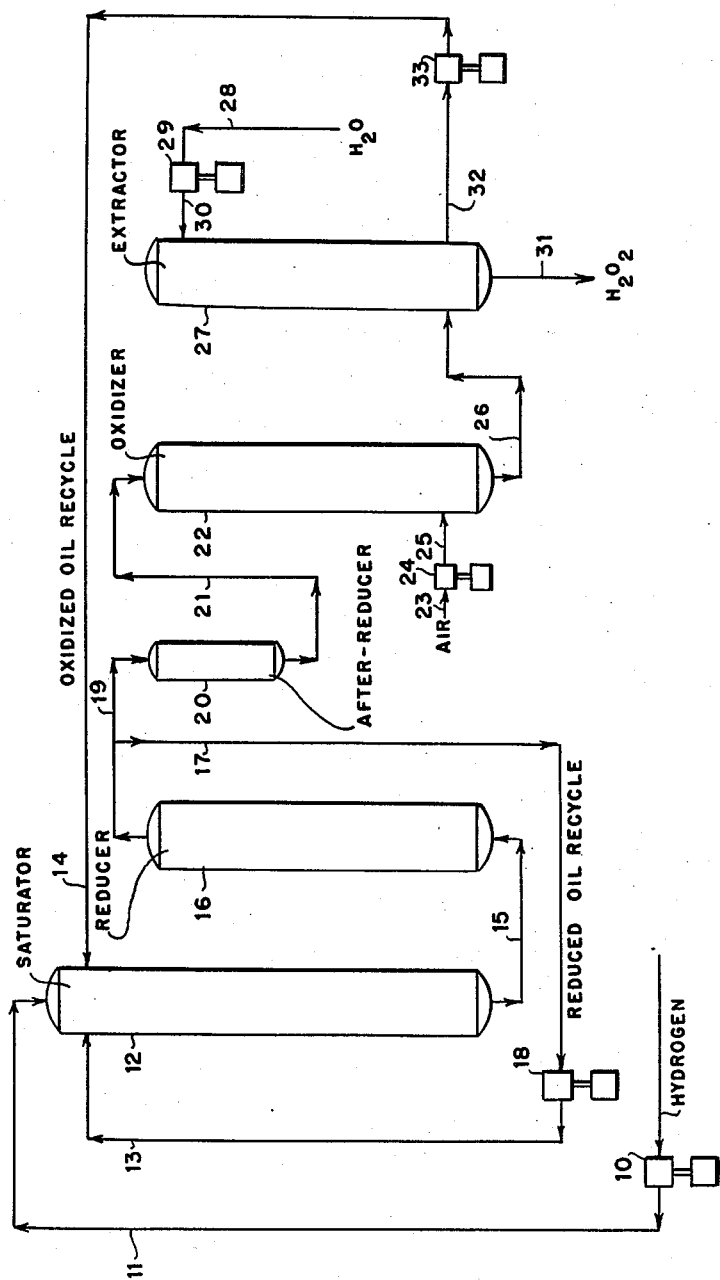
Theodore M. Jenney
INVENTOR
BY
Adams, Forward and McLean
ATTORNEYS

United States Patent Office 2,837,411
Patented June 3, 1958

2,837,411

PROCESS FOR PRODUCTION OF HYDROGEN PEROXIDE

Theodore M. Jenney, Kenmore, N. Y., assignor to Olin Mathieson Chemical Corporation, a corporation of Virginia Application November 25, 1952, Serial No. 322,431

4 Claims. (Cl. 23—207)

My invention relates to improvements in the production of hydrogen peroxide utilizing a substituted anthraquinone as an intermediate through successive reduction and oxidation steps. More particularly, it provides an improved method of reduction by pre-saturation of the intermediate with hydrogen and a recirculation system which provides a cyclic system susceptible of continuous operation.

In the manufacture of hydrogen peroxide by the use of alkyl anthraquinones as intermediates, a solution of the intermediate in a suitable solvent is first reduced partially to hydroquinone and the reduced solution treated with air or other oxygen-bearing gas. The oxidation of the intermediate reforms the anthraquinone and simultaneously produces hydrogen peroxide. The latter is removed from the intermediate solution usually by washing with water and the aqueous extracts are concentrated to obtain hydrogen peroxide of the desired concentration. The washed solution of intermediates is treated to remove residual hydrogen peroxide, dried and recycled to the hydrogenation stage.

Various alkyl anthraquinones have been proposed for this process including particularly isopropyl anthraquinone, tertiary butyl anthraquinone, 2,3-tetralanthraquinone and 2-methyl anthraquinone, but 2-ethylanthraquinone, is preferred. Mixtures of these anthraquinones may also be used. The anthraquinone is dissolved in an oil solvent usually comprising a mixture of light oils, for example, a mixture of tetralin and cyclohexanol. The factors determining selection of a solvent or solvent system are adequate anthraquinone and hydroquinone solubility, water immiscibility coupled with sufficient difference in density for clean settling, inertness with respect to hydrogen and oxygen, particularly in inertness as to dangerous hydroperoxide formation, and reasonably low volatility. Benzene, alkylated benzenes and methyl cyclohexanol are examples of useful solvent components.

As catalyst for the hydrogenation step, Raney nickel is commonly used. As described in copending application Serial No. 298,641, filed July 12, 1952, of John F. Haller, now U. S. Patent 2,804,376, a catalyst comprising palladium or platinum deposited on alumina produces substantial advantages in the production of hydrogen peroxide by an anthraquinone process, particularly when applied in the form of a fixed bed. The process is conducted under hydrogenation conditions of pressure and temperature and flow rate, advantageously controlled to obtain partial reduction to the extent of about 50 to 75 percent in a cyclically operated process. In general about 0.5 to 1 percent of palladium on alumina in the form of 20–100 mesh particles is preferred as the catalyst.

The oxidation of the partially reduced intermediate may be accomplished by simple contact with air or oxygen, but as described in the above Haller application, oxidation advantageously is effective by securing in-line liquid flow through a suitably packed oxidizing tower with countercurrent or concurrent oxidizing gas contact at about 40° to 50° C. and 15 to 300 p. s. i. a. The hydrogen peroxide may be recovered from the oxidized oil by water extraction in successive stages or by subjecting the oxidized oil to distillation in the presence of steam under reduced pressure as described in copending application Serial No. 298,642, filed July 12, 1952, of John F. Haller, Theodore M. Jenney and John W. Churchill.

The catalyst, intermediate and hydrogen gas are usually contacted by blowing the gas into the reduction zone containing catalyst while introducing intermediate oil. The blowing, however, promotes abrasion of the catalyst particles and support resulting in loss of catalyst and requires diffuser plates and other equipment. I have now found that hydrogen gas is sufficiently soluble in an oil solution of alkyl anthraquinones that the oil solution can be pre-saturated with hydrogen and substantial reduction of the intermediate to quinhydrone or hydroquinone effected when the hydrogen-containing solution is contacted with a hydrogenation catalyst without further addition of hydrogen to the contact zone, thus greatly simplifying the reduction operation. According to my invention, a recirculating system is established by recycling effluent from the reduction step to the hydrogen saturation step, adding oil separated from the peroxide recovery step to the hydrogen saturation step and withdrawing a portion of the reduced oil to the oxidation step. In this way a high circulation rate is obtained that permits significant reduction in catalyst requirements without affecting reduction efficiency.

The process of my invention then comprises establishing a continuous cycle of dissolving hydrogen gas in an oil solution of an alkyl anthraquinone, that is recycle reduced oil and recycle oil from the peroxide recovery step, reducing the hydrogen-containing solution by contacting the solution and a hydrogenation catalyst under partial reduction conditions of temperature and pressure providing partial reduction of the alkyl anthraquinone to the hydroquinone, recycling a substantial portion of the reduced oil to the hydrogen dissolving step, oxidizing the reduced solution with air or oxygen, treating the oxidized solution to recover hydrogen peroxide and returning separated solution to the hydrogen dissolving step.

By the process of my invention the reduction step is greatly simplified as it avoids any operation where there are blowing broblems, significant hold-up times and catalyst removal problems. Moreover, catalyst requirements are greatly reduced, e. g. as much as four fifths over the method of contacting the oil directly with hydrogen in the reduction zone, thereby effecting substantial savings in catalyst investment costs. Thus my method is especially adapted to cooperate in continuously operated reduction and oxidation steps to form a flexible continuous cyclic system in which requirements of materials, heat and equipment are economized.

The process of my invention will be further illustrated by reference to the accompanying drawing which is a simplified flow sheet of the cyclic means of performing my invention. In the drawing, hydrogen is introduced by pump 10 and line 11 into saturator 12 and dissolved in a mixture of recycle reduced oil introduced by line 13 and recycle oil from the hydrogen peroxide recovery step returned by line 14. The hydrogen-saturated oil flows under pressure by line 15 to reducer 16 which is packed with finely divided catalyst. Multiple reducers in parallel may be used to permit cleaning and replacing catalyst. A substantial portion of the effluent reduced oil is recycled by line 17, pump 18 and line 13 to the saturator 12 to maintain a body of reduced oil suitable for charging to the oxidizer and to maintain an adequate supply of hydrogen in the effluent from saturator 12 to effect reduction of the recycled oil from the hydrogen peroxide recovery step. A portion of the reduced oil passes by line 19 to the after-reducer 20 in which any residual dissolved hydrogen is utilized to reduce additional quantities of quinone. The thus reduced oil passes at substantially atmospheric pressure via line 21 to oxidizer 22. Air or other oxygen-bearing gas is introduced by line 23, pump 24 and line 25. Oxidized, peroxide bearing oil is transfered by line 26 to an extraction system 27 fed with water through line 28, pump 29 and line 30. Strong hydrogen peroxide is removed by line 31 while the separated intermediate-oil solution is recycled via lines 32, pump 33 and line 14 to saturator 12.

In an illustrative operation, hydrogen is compressed in a first stage to 50 p. s. i. g. and to 250 p. s. i. g. in a second stage. The saturator 12 is continuously charged with 550 gallons per hour of 50 percent reduced oil and 110 gallons per hour of recycle oil from the hydrogen peroxide recovery step (12 percent 2-ethylanthraquinone, 44 percent tetralin, 44 percent mixed methylcyclohexanols). The total charge to saturator 12 is thus 660 gallons per hour of 42 percent reduced oil. The oil, containing 0.157 gram of hydrogen per kilogram of oil, flows to reducer 16 and 660 gallons per hour where it is in contact with the catalyst for about 0.07 minute per pass. Reducer 16, charged with 100 mesh alumina bearing thereon 1 percent palladium, discharges 50 percent reduced oil containing about 0.0785 gram of unreacted hydrogen per kilogram of oil. About 550 gallons per hour of reduced oil is recycled and 110 gallons per hour passes through after-reducer 20 and into oxidizer 22. The after-reducer is packed with the same catalyst as reducer 16. The reduced oil is oxidized and extracted and recycled at the rate of 110 gallons per hour to saturator 12. Hydrogen peroxide in a concentration of 8 percent is removed at the rate of 8.2 gallons per hour.

Any suitable hydrogenation catalyst may be used but I prefer palladium or platinum. I also prefer palladium to platinum because of its lower cost. Furthermore, I prefer palladium to nickel, cobalt or the like because of its resistance to poisoning. The catalyst is advantageously used as a particle form fixed bed. As support for the catalyst, alumina is preferred. A particularly advantageous and preferred catalyst is that described in the above identified Haller application. The described catalyst is palladium or platinum on alumina and is prepared by absorbing a reducing agent, preferably hydrazine, on an activated alumina or alumina gel surface, contacting the alumina with a suitable metal salt solution, for example, palladium chloride, so that the metal salt is reduced and the metal precipitated in situ, and drying, sizing and igniting the catalyst before use. The catalyst is readily regenerated by air ignition. In general about 0.5 to 1 percent, of palladium on a support is used. A narrow range of support particles between about 40 to 100 mesh, for example, about 80 to 100 mesh is preferred. Such fine catalyst supports are not disadvantageous in reducing flow rates since considerable hydrogen pressures are desirable to prepare the saturated solution and are available for producing satisfactory flow rates through the finely divided catalyst supports.

I prefer to pump the solution of substituted anthraquinone and dissolved hydrogen through the packed column of supported catalyst, which may be horizontally or vertically arranged, at rates resulting in the reduction of the anthraquinone to at least about 50 percent and preferably about 50 to 75 percent reduction.

Recycle of the major proportion of the reduced oil to the hydrogen saturation step is required at practical operating pressures to maintain efficient operation. The recycled oil maintains an adequate supply of hydrogen in the effluent from the hydrogen saturation step to effect reduction of the recycled oil from the hydrogen peroxide recovery step and maintains a body of sufficiently reduced oil suitable for charging to the oxidizing step. A suitable ratio of recycle reduced oil to oil charged to the reduction step is about 0.8 to 1 for practical operating conditions.

Catalyst particles must be thoroughly removed before the oxidation step because the catalyst effectively decomposes hydrogen peroxide. Filtration of the effluent liquid is suitably interposed as precaution to avoid decomposition of the hydrogen peroxide formed in the oxidizer by any catalyst carried over. The oxidation of the partially reduced intermediate may be accomplished by simple contact with air or oxygen, but as described in the above Haller application, oxidation is effected by securing in-line liquid flow through a suitably packed oxidizing tower with countercurrent or concurrent oxidizing gas contact at about 40° to 50° C. and 15 to 300 p. s. i. a.

The recovery stage may be operated as a distillation system or as a water extraction system. The latter method requires at least three stages of contact of several minutes each for effective peroxide recovery. To produce a concentrated peroxide product, e. g. about 20 percent hydrogen peroxide, the extraction medium to the first stage comprises a dilute aqueous peroxide phase from a later extraction stage so that the oil is contacted successively with more dilute peroxide and the product stream is recovered from the first contact stage. Further concentration and purification may be effected by vacuum distillation. The recovery operation may be performed alternatively by subjecting the oil stream from the oxidation step to distillation in the presence of steam under reduced pressure. As described in the above identified Haller, Jenney and Churchill application, peroxide recovery, concentration and purification can be effected with surprising efficiency and economy in such a system. The peroxide stripping conditions advantageously are about 70° to 105° C. at 5 to 65 mm. of mercury pressure in the presence of steam in a manner taking most of the peroxide and water overhead together with a lesser amount of the solvent components. The condensed overhead separates into separate aqueous and oil phases, permitting oil reflux to the tower. The aqueous phase then can be rerun under reduced pressure conditions to the desired concentration.

With increasing temperatures and hydrogen pressures the rate of reduction increases and permits increased production. Temperatures may range from about 30° to about 65° C. but temperatures of about 45° to 50° C. are preferred. There is some danger of separation of the intermediate at lower temperatures especially when the concentration is near the upper limit of its range. Too high a temperature results in increased hydrogenation of the solvent and hydrogenation of the intermediate in other ways than by formation of the hydroquinone. Also, when the temperature is too high, the increased cost of cooling the reduced intermediate solution prior to the oxidation stage reduces the saving effected by increased reduction rates and may cancel it altogether.

Hydrogen pressures may be as high as about 300 p. s. i. or above to obtain higher production per pound of catalyst. The cost of compression and the necessity of using high pressure equipment is compensated by the savings in equipment size, catalyst required and in increased rates of production. Pressures of about 250 to 750 p. s. i. are preferred practical operating pressures. At pressures above about 750 p. s. i. enough hydrogen can be dissolved in the intermediate oil to permit operation without recycle to the hydrogen-dissolving step of reduced effluent and oil from the hydrogen peroxide recovery step. However, because of the cost of such a high pressure operation the use of lower pressures with a recirculating system is preferred.

About 9 to 12 percent of 2-ethyl anthraquinone or other selected anthraquinone is preferred in solution, advantageously in a mixture of methylcyclohexanol and tetralin. As low as about 8 percent or as high as about 15 percent may be used but at the higher concentrations there is danger of separation of the solid intermediate. The viscosity of the solution may increase sufficiently to decrease the rate of reaction and of flow through the catalyst bed. Increase of temperature to avoid these difficulties with solutions of high concentration increases the cooling problem discussed above. When the concentration of intermediate is below the preferred range the production per unit volume of solution is low and may become uneconomical.

When the reduced solution is oxidized as described in the above identified Haller application and the hydrogen peroxide is removed by water extraction, I find that I can eliminate the necessity for drying the recycled solution and removing unextracted hydrogen peroxide. While hydrogen peroxide should be avoided as far as possible in the recycled solution because it represents an inefficiency of removal of the desired product, removal of the last traces of hydrogen peroxide is not essential in my process. Such traces of residual hydrogen peroxide are promptly decomposed in the reducer and do not interfere with the operation in this step. Furthermore, water remaining suspended in the solution as a result of the washing operation or as a result of decomposition of residual hydrogen peroxide does not interfere with the hydrogenation step. In the oxidation step, a considerable proportion of such residual water may be removed by vaporization.

I claim:

1. In the production of hydrogen peroxide utilizing an alkyl anthraquinone as an intermediate wherein the intermediate in solution is reduced by reaction with hydrogen in a reduction zone followed by oxidation of the reduced solution in an oxidation zone and recovery of hydrogen peroxide from the oxidized solution, the method of reducing the intermediate in solution which comprises circulating solution between a hydrogen dissolving zone in which all the hydrogen for the reduction is dissolved in solution under elevated pressure in the absence of a catalyst prior to introduction to the reduction zone and the reduction zone, solution from the hydrogen peroxide recovery step and a major portion of the effluent from the reduction zone being circulated to the hydrogen dissolving zone in a continuous flow cycle, the solution from the hydrogen dissolving zone having all of the hydrogen for the reduction dissolved therein and free of any hydrogen gas being fed to the reduction zone where it is contacted with a particle form hydrogenation catalyst under partial reduction conditions, a minor portion of the effluent from the reduction zone being passed to the oxidation zone.

2. The method of claim 1 in which the reduction step is carried out at a temperature of about 30° to 65° C. and at a pressure of at least about 250 p. s. i. a. while controlling the reduction at about 50 to 75 percent conversion level.

3. The method of claim 1 in which the catalyst comprises a metal selected from the class consisting of palladium and platinum on alumina.

4. A cyclic process for the production of hydrogen peroxide by reducing with hydrogen in a reduction zone containing a particle form catalyst comprising a metal selected from the class consisting of palladium and platinum on alumina and then oxidizing in an oxidation zone an alkyl anthraquinone as an intermediate which comprises dissolving all the hydrogen for the reduction in a solution of an alkyl anthraquinone under elevated pressure in the absence of the catalyst, passing the hydrogen-containing solution free of hydrogen gas to the reduction zone and contacting the hydrogen-containing solution and catalyst in the reduction zone at a temperature of about 30° to 65° C. and a pressure of at least about 250 p. s. i. a. while controlling the reduction at about 50 to 75 percent conversion level, returning a major portion of the effluent from the reduction to the hydrogen dissolving step, withdrawing a minor portion of the reduction zone effluent and contacting said minor portion with an oxygen-bearing gas in the oxidation zone under oxidizing conditions of temperature and pressure, separating and recovering hydrogen peroxide from the oxidized solution and returning the solution separated from the peroxide recovery step to the hydrogen dissolving step.

References Cited in the file of this patent

UNITED STATES PATENTS

| 1,131,339 | De Jahn | Mar. 9, 1915 |
| 2,158,525 | Riedl et al. | May 16, 1939 |
| 2,215,883 | Riedl et al. | Sept. 24, 1940 |
| 2,282,184 | Harrower et al. | May 5, 1942 |
| 2,369,912 | Pfleiderer et al. | Feb. 20, 1945 |
| 2,657,980 | Sprauer | Nov. 3, 1953 |
| 2,689,169 | Hinegardner | Sept. 14, 1954 |
| 2,724,689 | Dunmire | Nov. 22, 1955 |

OTHER REFERENCES

Slater et al.: "The Anthraquinone Autoxidation Process for the Production of Hydrogen Peroxide," P. B. 4336, pages 6–10 and 17.

Lusch: "The Industrial Chemist," vol. 3, pages 249–256 (June 1927).